June 14, 1938.   R. C. BURT   2,120,546
MECHANICAL TRANSMISSION
Filed May 25, 1931   2 Sheets-Sheet 1

Inventor
Robert Cady Burt

Attorney.

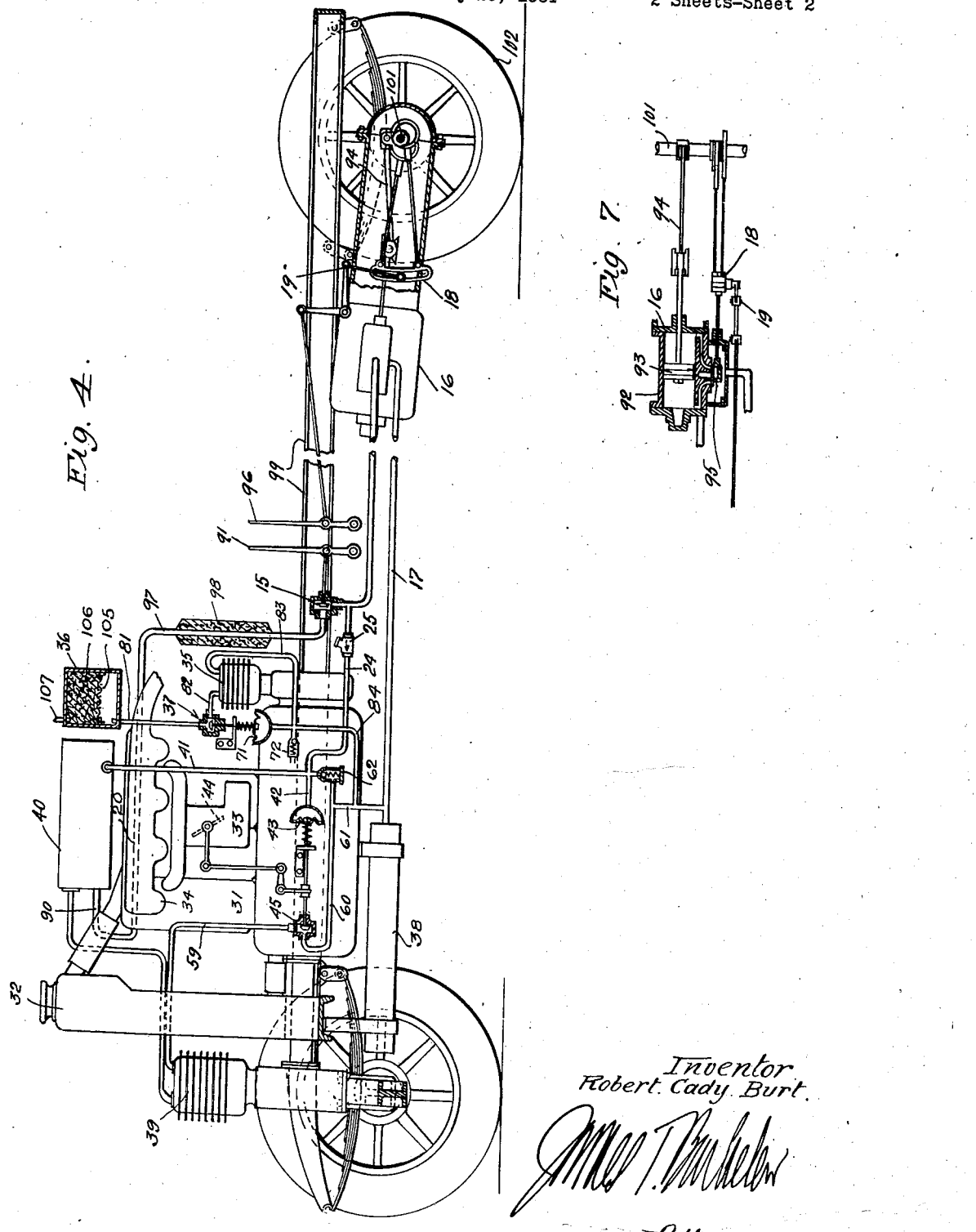

Patented June 14, 1938

2,120,546

UNITED STATES PATENT OFFICE 2,120,546

MECHANICAL TRANSMISSION

Robert Cady Burt, Pasadena, Calif.

Application May 25, 1931, Serial No. 539,966

2 Claims. (Cl. 60—14)

This invention relates to apparatus for the transmission and control of mechanical energy, force, power, or effect, from a source to any desired point.

This invention has for its object the economical transmission of mechanical power, with great flexibility of power and speed and fine control.

This transmission of power is accomplished through the medium of an elastic gas, vapor, or fluid.

In the following disclosure and claims the term "fluid" is used broadly to denote gas, vapor, air, or compressible liquid, or other material of like characteristics.

A compressor or pump is attached to the source of power and this compressor takes the fluid at a pressure $P_1$ and compresses it to a higher pressure $P_2$, thus doing mechanical work on the fluid and storing in the fluid the energy of compression. Another mechanism, known as a motor, takes this fluid and expands it back from pressure $P_2$ to $P_1$, thus extracting the power stored in the fluid during compression.

For many uses of this transmission it is desirable to use compressed air for the working substance or elastic fluid, and in many places in this disclosure I shall refer to the elastic fluid as the air, but I do not limit my invention to a transmission using air. In fact, under certain conditions, other vapors appear to be more desirable.

Figure 1:
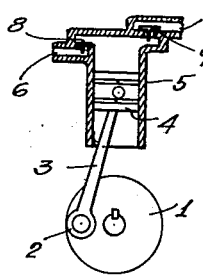
Figure 2:
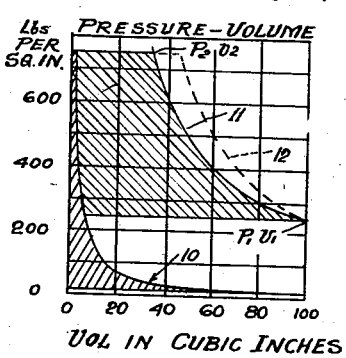
Figure 3:
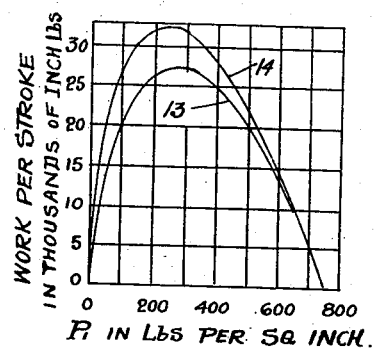
Figure 5:
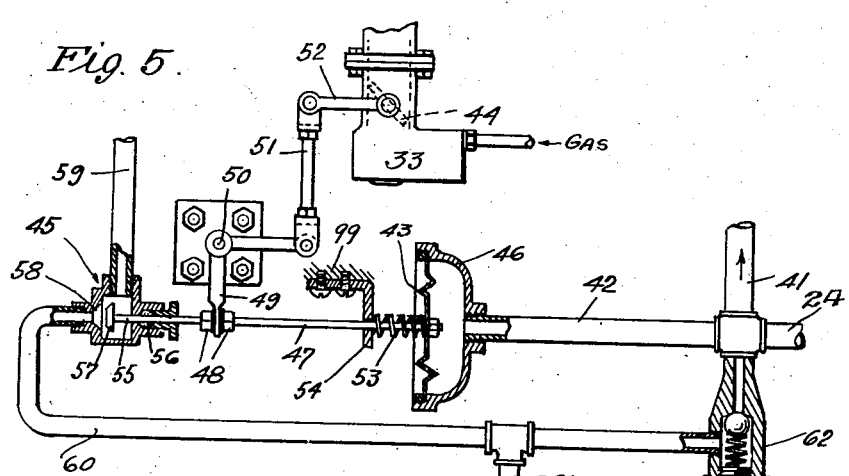
Figure 6:
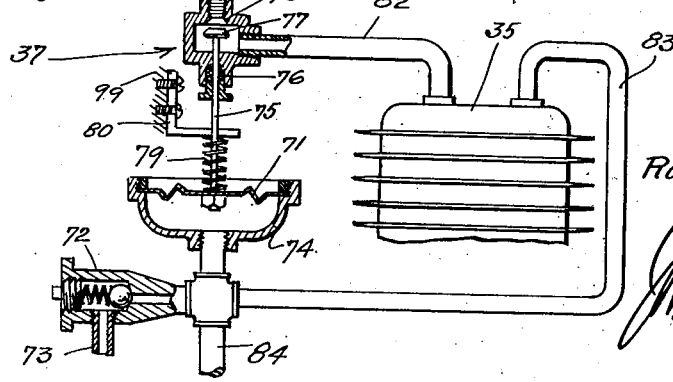

Referring to the drawings: Fig. 1 is a sectional view of an air compressor; Fig. 2 is a pressure volume diagram of an air compressor; Fig. 3 is a graph showing the variation in work done by an air compressor when the initial volume and final pressure are held constant and the initial pressure is varied; Fig. 4 illustrates one specific application of this transmission to a motor car; Fig. 5 is a diagram of the high pressure control system; Fig. 6 is a diagram of the low pressure control system; Fig. 7 is a horizontal longitudinal sectional view of the air motor.

In Fig. 1 is diagrammed an ordinary air compressor, having a crank shaft 1, a crank 2, connecting rod 3, piston 4, which moves up and down with the rotation of the crank-shaft inside of the cylinder 5 which the piston tightly fits. On the down stroke of the piston air is drawn into the cylinder through the intake 6 and inlet valve 8 and is compressed on the up stroke of the piston, being forced out of the compressor through check valve 9 and exhaust outlet 7. The amount of compression depends upon the intake pressure $P_1$ and the pressure into which the exhaust is discharging or $P_2$.

It is well known to engineers that the work performed by the piston on the gas in this operation is equal to the integral of the pressure multiplied by elemental changes in volume taken around the cycle.

To illustrate:—assume we have a cylinder of 100 cubic inches capacity, that it is filled with air at 15 lbs. per sq. inch and that no air can escape until we have compressed this air to a pressure of 750 lbs. per sq. inch. Curve 10 of Fig. 2 shows how the pressure within this cylinder increases as the volume is decreased until 750 lbs. per sq. inch pressure is reached and then the air is exhausted. The statement in the preceding paragraph simply states that the work done by the cylinder on the air is proportional to the area to the left and below the curve 10 and above the horizontal line of 15 lbs. per sq. inch and to the right of the vertical line representing zero volume.

In the formulae employed to explain my invention, the following characters appear and have the meanings here set forth:

$P_1$=pressure of fluid prior to compression.
$P_2$=pressure of fluid after compression.
P or $p$=pressure of a fluid, generally.
V or $v$=volume of a fluid, generally.
T=temperature of a fluid, generally.
K=gas constant of a fluid, generally.
$C_p$=specific heat of a fluid at constant pressure.
$C_v$=specific heat of a fluid at constant volume.
W=work of compression of a fluid.
$e$=the logarithmic exponent =2.718.
$K^1$=a constant related to K.
$V_1$=volume of fluid prior to compression.
$\gamma=C_p$ divided by $C_v$.

If the compression has been performed isothermally or at constant temperature, the equation of the curve is given by Equation 1, as follows:

$$PV \equiv KT \quad (1)$$

If the compression has taken place adiabatically or without loss of any heat by the air, then the equation is that given by Equation 2, as follows:

$$PV^\gamma = \text{Constant} \quad (2)$$

Curve 11, Fig. 2 represents the same equation (No. 1 above) as curve 10, except that the initial pressure $P_1$ is higher and the work done is represented by area bounded by the lines $P_1=250$ lbs. per sq. inch; $v=$ zero; $P_2=750$ lbs. per sq. inch; and the curve 11. Curve 12 represents the Equation 2 above, at the same volume and pressure as curve 11.

$$\frac{C_p}{C_v} = \gamma \quad (3)$$

Equation 3 states the well known gas law:—specific heat at constant pressure $C_p$, divided by specific heat at constant volume $C_v$, is a constant. This constant is represented by the Greek letter $\gamma$. For air it is 1.4.

To obtain the expression for the work of compression at constant temperature, we proceed as follows:

$$\text{Work (T constant)} = W = \int p\,dv$$

Or, instead of integrating $p\,dv$ around the cycle, we may integrate $v\,dp$ between the limits of $P_1$ and $P_2$, which is the same thing. Thus, $$W = \int_{P_1}^{P_2} v\,dp = P_1 V_1 \int_{P_1}^{P_2} \frac{dp}{p} = P_1 V_1 \left[ \log_e p \right]_{P_1}^{P_2} =$$

$$P_1 V_1 \log_e\left(\frac{P_2}{P_1}\right) \quad (4)$$

The expression for the work of adiabatic compression is derived as follows:

$$PV^\gamma = K, \text{ or } P^{\frac{1}{\gamma}} V = K^1$$

$$W = \int_{P_1}^{P_2} v\,dp = P_1^{\frac{1}{\gamma}} V_1 \int_{P_1}^{P_2} \frac{dp}{p^{\frac{1}{\gamma}}}$$

$$= \frac{P_1^{\frac{1}{\gamma}} V_1}{1 - \frac{1}{\gamma}} \left( P_2^{1-\frac{1}{\gamma}} - P_1^{1-\frac{1}{\gamma}} \right) \quad (5)$$

If the initial volume $V_1$ and final pressure $P_2$ are held constant, and if different values of the input pressure $P_1$ are taken, it will be found that the work done by the compressor increases as $P_1$ increases up to a certain value and then decreases as $P_1$ approaches $P_2$ in value. This is shown graphically as an example in Fig. 3 where $V_1$ is taken as 100 cu. inches; $P_2$ is taken as 750 lbs. per sq. inch; and the work $W$ is plotted against the different values of $P_1$. Curve 13, Fig. 3 corresponds to Equation 4 and curve 14 corresponds to Equation 5. Both curves have maxima at nearly the same value of compression ratio. These maxima are obtained by differentiation of Equations 4 and 5, obtaining 6 and 7 below.

Differentiating Equation 4, holding $P_2$ constant, we have $$P_1 V_1 \log_e\left(\frac{P_2}{P_1}\right) = P_1 V_1 (\log_e P_2 - \log_e P_1)$$

$$\frac{dW}{dP_1} = (\log_e P_2 - \log_e P_1) V_1 - \frac{P_1 V_1}{P_1} = \left(\log_e \frac{P_2}{P_1} - 1\right) V_1$$

Equating the derivative $$\frac{dW}{dP_1}$$

to zero to find the maximum value for W, results in a maximum value appearing when $$\frac{P_2}{P_1} = e = 2.718 \quad (6)$$

Differentiating Equation 5, holding $P_2$ constant, we have:

$$W = \frac{P_1^{\frac{1}{\gamma}} V_1}{1 - \frac{1}{\gamma}} \left( P_2^{1-\frac{1}{\gamma}} - P_1^{1-\frac{1}{\gamma}} \right) = \frac{V_1}{1 - \frac{1}{\gamma}} \left( P_1^{\frac{1}{\gamma}} P_2^{1-\frac{1}{\gamma}} - P_1 \right)$$

$$\frac{dW}{dP_1} = \left( \frac{V_1}{1 - \frac{1}{\gamma}} \right) \left( P_2^{1-\frac{1}{\gamma}} \frac{P_1^{\frac{1}{\gamma}-1}}{\gamma} - 1 \right)$$

By equating to zero, we find a maximum value for W when $$\frac{P_2}{P_1} = \gamma^{\frac{\gamma}{\gamma-1}} \quad (7)$$

For air, $\gamma = 1.4$, and $$\frac{P_2}{P_1}$$

becomes 3.2 for maximum work.

It is also evident from Fig. 3 that much more work can be obtained from a given cylinder working at a limited upper pressure $P_2$ by proper selection of the initial pressure $P_1$. For example, the compressor diagrammed in Fig. 2 would absorb less than 6000 inch lbs. per stroke when operating from atmospheric pressure to 750 lbs. per sq. inch as in curve 10 and it would absorb more than 27,000 inch lbs. per stroke when operating from 250 lbs. per sq. inch to the same upper pressure.

From the foregoing consideration, it is evident that a power transmission can be designed using previously compressed air for its low pressure intake and compressing it over a comparatively small pressure ratio to a higher pressure. Then, after transmission through a pipe and control, the compressed air can be expanded through an air motor back to the same pressure as that from which it started.

By this means a transmission of extreme lightness, flexibility, compactness and economy and having other desirable features, may be obtained.

Fig. 4 shows a specific application of this transmission to a motor car and, while I do not limit my invention to automobile transmissions, it will serve as an example to illustrate the principles involved.

Referring to Fig. 4, 31 is a gasoline engine having a radiator 32, carburetor 33, and exhaust manifold 34. This engine, being started in any of the usual manners, drives a small auxiliary compressor 35. This compressor takes air from the atmosphere through a cleaner, conventionally illustrated at 36, and throttle 37, compresses and discharges it through the pipe shown into tank 38. The cleaner 36 may consist of a box or can having supported, spaced from the bottom, a wire screen 105 above which is placed bronze wool 106. The intake pipe 107, open to the atmosphere, enters at the top, and the discharge pipe 81 passes out the bottom of the cleaner. At the same time the power compressor 39 has been taking air from 38, compressing and discharging it into tank 40. This process is continued until the pressure in tank 40 has been built up to a certain predetermined value, for example, 750 lbs. per sq. inch. When $P_2$, the pressure in tank 40, has reached this pressure the connecting tube 41 and the tube 42 transmits this pressure to the diaphragm 43 which expands closing the throttle 44 of carburetor 33 and closing the intake to pump 39 by action of valve 45.

The action of this control mechanism can be best understood by referring to Fig. 5. Diaphragm 43 is secured at its outer edge to shell 46 which is mounted on the car frame 99. Attached to the center of diaphragm 43 is a rod 47 on which are nuts 48 spaced somewhat apart. Carried between these nuts is bell crank 49 pivoted about a center 50 and operating on the butterfly valve 44 of carburetor 33 through links 51 and 52. The movement of diaphragm 43 due to pressure in shell 46 is resisted by springs 53 which is in compression between the diaphragm and bracket 54 mounted on the car frame. An extension 55 of rod 47 passes through packing 56 and carries a cone 57 that seats against seat 58 of valve 45 when diaphragm 43 is extended. Compressor 39 takes in air through pipe 59, valve 45, pipe 60, pipe 61, from the low pressure tank 38. It is obvious, then, that the action of the diaphragm 43 under pressure is to close the engine throttle 44 and also the valve 45, choking off the intake to the compressor and unloading it.

At this stage the engine idles under little or no load and the pressures are maintained. When $P_1$ reaches its proper value, for example, 250 lbs. per sq. inch, then diaphragm 71 closes valve 37 and no more air is pumped into the system until some escapes. Should pressure $P_1$ become too high, safety valve 72 lets air escape to atmosphere through pipe 73. In the same manner safety valve 62, allows air to escape from tank 40 through pipes 41, 60, and 61 back to low pressure tank 38, if $P_2$ should become too high.

The action of the low pressure control can be seen in detail by referring to Fig. 6. Diaphragm 71 is secured at its outer edge to shell 74 which is mounted on the car frame. Attached to the center of the diaphragm is rod 75 that extends through packing 76 and carries a cone 77 that seats on valve seat 78 of valve 37 when diaphragm 71 is extended. The movement of the diaphragm 71 is resisted by spring 79 which is in compression between diaphragm 71 and bracket 80 mounted on the car frame. Compressor 35 takes air from the atmosphere through cleaner 36, pipe 81, valve 37, and pipe 82, discharging it through pipe 83, and pipes 84 and 61 into low pressure tank 38. When the pressure in tank 38 reaches a predetermined value the diaphragm 71 will have extended, pushing the rod 75 upward and closing the valve 37. The compressor 35 is then unloaded and inactive until the pressure in tank 38 drops sufficiently to permit the diaphragm actuated valve to open and allow air to be taken in by the compressor.

High pressure air from tank 40 is brought back through pipe 90, through throttle valve 15, operated by lever 91, to the intake side of engine 16 which expands the air and returns it to tank 38 through pipe 17. Thus no air is lost from the system.

Engine 16 is exactly like a steam or compressed air engine having the usual cylinder 92, piston 93, connecting rod 94, and valve mechanism 18 which through the valve link 19 controls the time of cut-off and admission as well as the exhaust events through change of the phase relation of valve 95 with respect to piston 93. A standard Stephenson link has been shown and since this valve gear is so old and so well known to those skilled in the art, it is not considered necessary to explain its operation in detail. The connecting rod 94 operates through a crank to turn rear axle 101 to which are attached driving wheels 102.

The entire mechanism up to throttle 15 and return pipe 17 is automatic, the entire control of the automobile is accomplished by manipulation of the throttle 15 through lever 91 and control 19 through lever 96. These are operated exactly in the same manner as a steam engine.

Many economies may be incorporated in this system. For example: compressor 39 and tank 38 may be placed out in front where, being in the air stream incident to the travel of the vehicle, they would be cooled, thus reducing the volume of air to be compressed, and the compressor 39 and tank 38 are so shown in this preferred arrangement in Fig. 4. The high pressure air may be passed through a heat interchanger 20 in the exhaust manifold for the purpose of expanding the air, or reducing its density, by taking waste heat from the exhaust gases. The pipe 97 and engine 16 may be heat insulated to conserve this heat.

Another economy of the system is that the gasoline engine is always working under high torque and never running at high speed and light load. As will be understood from the control operations explained, the engine is always either operating with full compressor load, or is idling at closed throttle with the compressor unloaded.

A simple pipe 24 and check valve 25 shunting valve 15 permits regenerative braking. For regenerative braking the valve 15 is closed and the links 19 are gradually shifted to the reverse position, thus causing air to be taken from tank 38, compressed by engine 16 and driven through pipe 24, check valve 25 and pipe 41 back into tank 40. This continues until a higher pressure is reached in tank 40, of, perhaps, 1200 lbs. per sq. inch. Thereafter air escapes through relief valve 62 into tank 38 again with a small amount of heating, due to the Thompson-Joule effect.

After this regenerative braking process, the excess pressure is available for subsequent acceleration without any call upon the motor 31.

While I have shown reciprocating motors and compressors, I do not wish the invention in certain of its aspects to be limited thereto, as machines other than those with reciprocating pistons may be suitable.

I claim:

1. In combination, a reversible valve fluid motor adapted for driving a vehicle, a prime mover, a fluid compressor driven by said prime mover, a high pressure connection between the exhaust port of said compressor and the intake port of said motor, a low pressure connection between the exhaust port of said motor and the intake port of said compressor, a high pressure reservoir in said high pressure connection, a low pressure reservoir in said low pressure connection, means controlling the operation of said compressor tending to maintain the pressure in said high pressure reservoir, substantially constant at a normal value, a relief valve connected to said high pressure reservoir, said relief valve being set to discharge at some pressure higher than said normal pressure and adapted thereupon to discharge fluid into said low pressure reservoir, means for reversing the valves on said motor to cause the motor to act as a compressor, a throttle in said high pressure connection between said high pressure reservoir and said motor, and valve means adapted when said throttle is closed to prevent the flow of fluid from said high pressure reservoir into said motor but to permit fluid compressed by the motor to be pumped back into the high pressure reservoir.

2. In combination, a vehicle, a valve controlled reversible fluid pressure motor for driving said vehicle, a prime mover, a compressor driven by said prime mover, a high pressure connection between the exhaust port of said compressor and the intake port of said motor, a low pressure connection between the exhaust port of said motor and the intake port of said compressor, a high pressure reservoir in said high pressure connection, a low pressure reservoir in said low pressure connection, means controlling the operation of said compressor tending to maintain the pressure in said high pressure reservoir substantially constant at a normal value, a relief valve connected to said high pressure reservoir, said relief valve being set to discharge at some pressure higher than said normal pressure and adapted thereupon to discharge fluid into said low pressure reservoir, means for reversing the valves on said motor to cause the motor to act as a compressor, a throttle in said high pressure connection between said high pressure reservoir and said motor, and a check valved connection shunting said throttle and acting independently of the setting of said throttle to permit fluid compressed by the motor to be pumped back into the high pressure reservoir.

ROBERT CADY BURT.